United States Patent [19]

Laurenz

[11] 3,960,110
[45] June 1, 1976

[54] ANIMAL FACILITY EQUIPMENT
[76] Inventor: Frank R. Laurenz, P.O. Box 359, Eagle Butte, S. Dak. 57625
[22] Filed: Mar. 21, 1975
[21] Appl. No.: 560,601

[52] U.S. Cl. .............................................. 119/28
[51] Int. Cl.² .................... A01K 1/00; B65G 25/08
[58] Field of Search .................. 119/15, 16, 22, 28; 198/232, 40, 208

[56] References Cited
UNITED STATES PATENTS

| | | | |
|---|---|---|---|
| 3,805,741 | 4/1974 | Thompson et al. | 119/20 |
| 3,827,402 | 8/1974 | Laurenz | 119/15 |

Primary Examiner—Hugh R. Chamblee
Attorney, Agent, or Firm—Robert C. Baker

[57] ABSTRACT

An animal facility, having a movable assembly and means for moving it along an alleyway, is equipped with means for emergency reversal of the direction of travel of the assembly at any point in its path of movement. The emergency reversal means comprises a stress balance means which normally remains in a balanced condition, but shifts to an unbalanced condition when the normal movement of the assembly is obstructed. The unbalanced condition is sensed; and actuating means responsive to the sensing is relied upon to effect reversal of travel.

28 Claims, 6 Drawing Figures

U.S. Patent  June 1, 1976  3,960,110
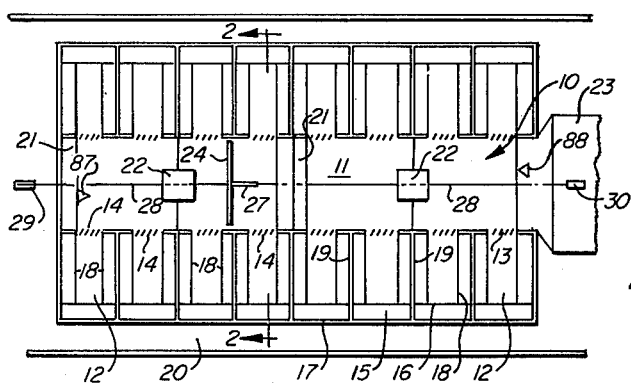
Fig. 1
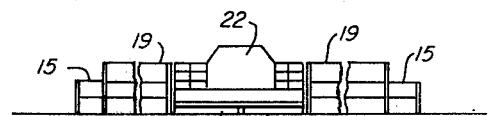
Fig. 2
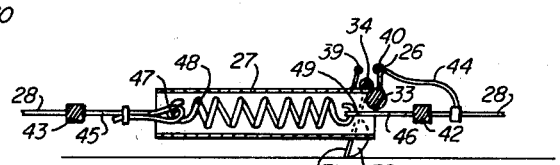
Fig. 4
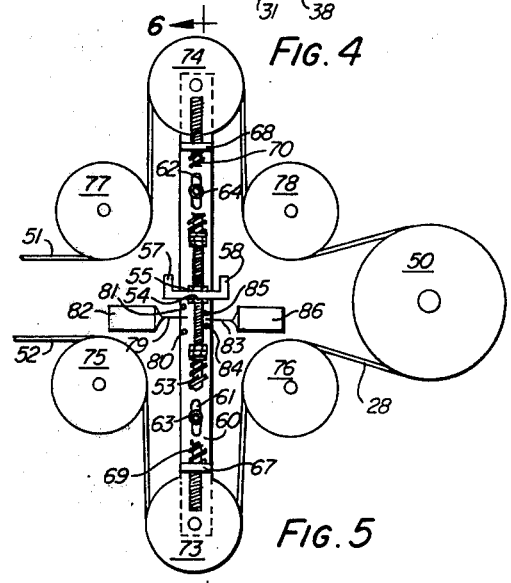
Fig. 3
Fig. 5
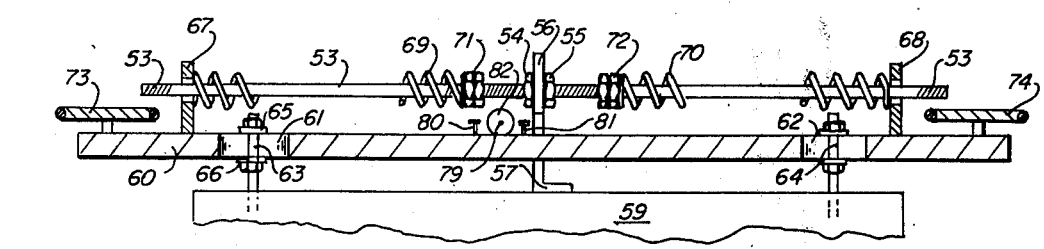
Fig. 6

ANIMAL FACILITY EQUIPMENT

This invention relates to an animal facility having a movable assembly and means for emergency reversal of the direction of travel of the assembly at any point in its movement.

Animal facilities having automatically movable assemblies (such as scrapers for removing dung) are well known; but none is known to have the special safety reversal features of the invention taught herein. Automatic or attendant-free operation is desired to reduce labor expense; but if reclining or standing animals (whether sick or previously injured or just tired) are injured or killed by the equipment, such losses tend to offset the benefits of automatic operation. Likewise if the equipment is damaged by animals (e.g., those not moving out of the way of the equipment), the resulting loss detracts from the benefits expected from automatic operation.

Teachings of this invention are useful in a variety of animal facilities (for cattle, pigs and other animals), especially free stall animal facilities. Illustratively, in free stall sow farrowing, the sow is free to leave her farrowing stall for eating, drinking, exercising, and dunging, suitably in an alleyway near her farrowing stall. Her young pigs should be confined to the farrowing stall. The alleyway frequently is partitioned to limit each sow's movement away from her young pigs; and the partitions suitably include feed dispensers and water dispensers for the sows.

The animal facility of this invention broadly comprises an alleyway, a movable assembly for clearing the alleyway, and power train means for effecting automatic movement of the assembly along the alleyway. An essential feature of this facility is that it additionally includes means for emergency reversal of the direction of travel of the assembly at any point in its movement along the alleyway. The emergency reversal means comprises:

i. a stress balance means in the power train means; the stress balance means is in a substantially balanced condition during normal movement of the assembly but is responsively shifted into an increasingly unbalanced condition commensurate with any interference with the normal movement as caused by an object obstructing the normal movement;

ii. primary sensing means for detecting a predetermined unbalanced condition of the stress balance means; and iii. actuating means responsive to the primary sensing means for actuating a reversal of the direction of travel of the assembly.

The movable assembly may comprise a dung scraper, or an electrode, or both. It may alternatively comprise a brush or other element, without a scraper or an electrode.

It is the features for the emergency reversal system of this invention which make it so useful in solving or mitigating problems of animal injury or equipment damage such as aforenoted. Insofar as is known, those problems have received little attention heretofore, and have never heretofore been overcome or solved in the manner taught herein.

The invention will further be described by reference to a drawing, made a part hereof, wherein:

FIG. 1 is a top schematic plan view of an animal facility incorporating features of the invention;

FIG. 2 is a schematic cross-sectional view taken along lines 2—2 of FIG. 1;

FIG. 3 is a schematic perspective view of a composite movable assembly comprising an electrode and scraper;

FIG. 4 is a sectional view taken on line 4—4 of FIG. 3 and illustrating internal elements within the tongue of the apparatus illustrated in FIG. 3;

FIG. 5 is a schematic plan view of a stress balance means, partially broken away, and includes a portion of a power train for the movable assembly; and FIG. 6 is a schematic cross-sectional view of the stress balance means, taken on line 6—6 of FIG. 5, with parts broken away and background elements omitted to improve the clarity of the showing.

Referring particularly to FIGS. 1 and 2, an alleyway 10, suitably having a substantially horizontal animal-supporting surface 11, extends along part of or the entire length of an animal facility. (In the case of round facilities, the length or arrangement of the alleyway may be circular.) Several animal stalls 12 may be located along one or both sides of the alleyway, with an access opening 13 into each stall. For free stall sow farrowing, opening 13 preferably comprises a selective barrier or gate, schematically illustrated at numeral 14 in FIG. 1, which allows the passage of sows or mother pigs while obstructing the passage of baby pigs or piglets. Each stall may also be provided with a piglet creep area 15 formed by an elevated sow barrier wall 16, spaced from end wall 17. A crush rail 18, to protect young pigs from being crushed as a sow lies down, may be placed in spaced relationship from the side walls 19 and floor 11. The facility may include a service alley 20 for attendants. Feed dispensers 21 and water dispensers 22 may be installed in partitions across the main alleyway. They should be disposed in a sufficiently elevated relationship above the floor 11, so as to allow the movable assembly discussed hereinafter to pass underneath them as it transverses the length of the alleyway. One end of the main alleyway is suitably provided with a pit or container 23 for receiving dung scraped from the alleyway. Wood, metal or any other suitable material resistant to damage by animals may be used to fabricate various elements of the facility.

Next to be discussed is the movable assembly 24 for clearing the alleyway (see FIGS. 3 and 4). This assembly may comprise or consist essentially of a scraper 25 for clearing (or cleaning or removing) dung from the alleyway. It may comprise or consist essentially of an electrode 26 for clearing animals from the alleyway—by causing them such discomfort that they willingly try to move or remove themselves from the vicinity of the electrode as it moves along the alleyway. But injured or sick animals may lie down in the alleyway and be unable or unwilling to stand up and step over or step away from the moving assembly. It is under such circumstances that the emergency reversal system hereof functions to save those animals from further injury and to save the equipment from unnecessary damage.

The movable assembly 24 may include a tongue member 27 for drawing or pulling it along the alleyway. A cable 28, or equivalent means ("cable" being used herein in a generic sense), is operably connected to opposite sides of the assembly 24. The cable may be looked upon as being substantially endless in terms of its operational or functional arrangement in the apparatus. While a single cable for drawing or moving assembly 24 is illustrated, a parallel arrangement of two or more cables or the like may be employed, if desired. Cable 28 is entrained over pulleys 29 and 30, suitably electrically insulated, at opposite ends of the alleyway, as for example illustrated in FIG. 1.

An illustrative suitable scraper 25 for removing dung may comprise an elongated member having two parts or scraper blades 31 and 32, one on each side on tongue 27 and extending transversely across the alleyway. The scraper sections 31 and 32 are suitably fastened to frame rod 33 by hinges 34, which permit upward pivoting of the scraper sections 31 and 32. The floor-contacting edge of metal scrapers may carry a flexible strip of plastics or rubbery material (or scraper blades may consist of plastics or rubbery material) to reduce abrasive wear of the floor surface. Frame rod 33, which is supported by other frame elements such as skids 35 and 36, may function as a backing member to support the scraper in a scraping position (i.e. a first or scraping position for the scraper parts 31 and 32) for removing dung as the scraper is moved in the direction of the tongue 27. Other means may be employed to support the scraper in scraping position; for example, skids 35 and 36 and their brackets 37 may perform that function. The skids might be replaced by wheels or other support elements.

During movement of the scraper down the alleyway in a reverse direction (that is, in the direction opposite the tongue extension and opposite the direction for scraping action), the scraper preferably automatically assumes a second position, that is, one not scraping dung from the floor. It suitably tilts upwardly at its pivot hinge attachments 34 and may ride on any suitable rearwardly projecting elevator 38 (see FIG. 4). A T-bar 39 suitably extends upwardly from the tongue 27 and projects at its cross member sufficiently over tilted scraper parts 31 and 32 to stop those parts from being tilted upwardly beyond the limits of the cross member of the T-bar. This feature also prevents animals from tilting scraper parts 31 and 32 into a position of rest above the frame bar 33. Scraper parts 31 and 32 tilt downwardly under their own weight (plus the friction of the floor against skid elevators 38) when the direction of movement is changed toward the direction of the projection of the tongue 27.

An illustrative suitable electrode means may comprise an elongated electrode rod 26 mounted in insulated holders 40 carried by brackets 41 on frame rod 33. Electrode 26 suitably extends transversely across the alleyway 10 in a relatively close but spaced (that is, a "proximate") relationship to the floor 11. About 5 or 10 or 15 centimeters above the floor is within the preferred proximate range.

In the embodiment shown, electrical charges for the electrodes are carried through cable 28, which is connected to the assembly 24 through insulators 42 and 43. Further, various structures over which the cable rides are suitably electrically insulative. A by-pass connector 44 conveys electrical charges from cable 28 to electrode 26.

In the illustrated embodiment, the tongue portion 27 of the movable assembly 24 is in the form of a sleeve, of length of pipe, securely fixed to frame rod 33. The end 45 of cable 28 is securely fastened to a bolt 47 which extends transversely through the outward end of the tongue. Within tongue 27 is a coiled spring 48. One end of spring 48 is looped aroung bolt 47; and the other end is fastened or hooked to a looped end 49 of cable part 46. Thus, spring 48 permits some shifting of the position of assembly 24 (from a truly transverse to a slightly angular position across an alleyway). Apart from the two noted connections to the movable assembly, the cable 28 is substantially endless. It extends from the movable assembly to pulleys 29 and 30 at opposite ends of the alleyway; and from those pulleys it extends (overhead in the rafter portion of the facility, or under the floor of the facility) to a drive pulley or other power means for pulling or drawing the cable and assembly 24 in opposite directions.

Referring now particularly to FIGS. 5 and 6, an illustrative preferred embodiment for the drive system and the means for reversing the direction of travel of the movable assembly will be described.

A drive pulley 50 is mounted in any suitable manner to cause a taut condition for the cable 28 in its loop over the drive pulley. Any suitable frictional contact of the cable 28 with the drive pulley may be employed Power from a reversible electrical motor (not shown) is transmitted, preferably through a speed or gear reduction system, to the drive pulley in any suitable manner.

One stretch of cable 28, as it extends from the drive pulley to the movable assembly, is numbered 51 in FIG. 5; and the other stretch from the drive pulley to the assembly is numbered 52. Between these two stretches of the cable is located a stress balance means or system.

The illustrated stress balance means comprises a rigidly fixed base member 53 in the form of an elongated member or rod. It is suitably threaded, as illustrated, to permit adjustment of biasing stress members, as will be explained. This base member 53 is mounted in any suitable way on base or immovable frame elements. It is rigidly fixed or mounted against movement. Illustratively, base rod 53 is fixed by bolts 54 and 55 to a bracket or plate member 56. The bracket plate 56 is supported by two legs 57 and 58 in elevated relationship above a base frame 59. Legs 57 and 58 are fixed to base frame element 59.

Another part of the stress balance system is an elongated action member 60. This elongated member extends in substantially parallel relationship to the elongated base 53. But the mounting of the action member 60 is such that it is free to shift or slide or move. (Action member 60 is free to move beneath bracket plate 56 and between legs 57 and 58.) Illustratively, the action member may take the form of an elongated plate of metal with aligned elongated openings or slots 61 and 62 in it. Bolts 63 and 64 are rigidly fixed to base frame 59. Bolt 63 extends through slot 61. Plates or washers 65 and 66 are held in fixed position (by any suitable means such as nuts, or the like) on bolt 63; and washers 65 and 66 serve with bolt 63 as guide members for the movement of the slot 61. Similarly, bolt 64 and its washers (not numbered in the drawing) serve to guide the permissible sliding movement for slot 62. Thus, the action member 60 is mounted to permit shifting or sliding movement of it in its longitudinal direction. Further, the mounting permitting the sliding movement also maintains the parallel relationship of the action member 60 to the base member 53 during the sliding or shifting movement.

Fixed rigidly to each end portion of the action member 60 are upstanding plate brackets 67 and 68. Each bracket 67 and 68 has a hole or opening through which base rod 53 freely extends. Base rod 53 is not fixed to brackets 67 and 68, but rod 53 serves as a guide element along which brackets 67 and 68 may move as the action member 60 is shifted longitudinally.

Stress members 69 and 70 (suitably in the form of coiled rods resembling a coiled spring) are mounted to exert their biasing forces in an opposing manner. The coil of each stress member 69 and 70 may be wrapped around base rod 53, as illustrated. Each stress member 69 and 70 is mounted under compression, which may be adjusted as desired. Stress member 69 extends from a fixed position 71, attached to the base rod 53, to a fixed position 67 attached to the movable action member 60. Likewise, stress member 70 extends from a fixed position 72 attached to the base member 53, to a fixed position 68 attached to the action member 60. The fixed positions 71 and 72 attached to the base rod 53 may be formed by nuts on the threaded base rod 53; and these nuts may be manually adjusted to increase or decrease the degree of compression of the coiled stress members 69 and 70. The important point is that the degree of compression, or built-in stress, for each stress member 69 and 70, should be manually adjusted or otherwise adjusted so that the biasing stress of member 69 approximately equals that for member 70, and vice versa. Thus, the biasing action of the stress members is opposite and approximately equal. Further, the degree to which each stress member 69 and 70 is compressed should be sufficient to prevent shift of action bar 60 out of balanced condition as a normal load of manure or dung is pulled along by the scraper 25, as will be evident from discussion below. The arrangement maintains the action member 60 (which is acted upon by the force of the opposing stress members 69 and 70 pressing against opposing brackets 67 and 68) in a substantially balanced condition, but a condition which can become unbalanced whenever the forces of an obstruction to movement of assembly 24 are imposed on the balance or action member 60.

At each end of action member 60 is mounted a cable entraining means; and each may take the form of a pulley 73 and 74 over which the cable 28 is entrained. The pulleys 73 and 74 are mounted on opposite ends of the action member 60 in such a way that they clear the base rod 53, and other stationary parts of the assembly, as they are shifted as part of the action member 60 during operation of the balance system.

Cable guides or idler pulleys 75, 76, 77, and 78 are mounted in any suitable manner on the base frame 59. They need not be mounted for any shift of position with respect to the base frame; and preferably they are mounted against any relative shift of position, except, of course, idler rotation.

It is emphasized that the stress balance means, and particularly the action member 60, is interposed and acted upon by a part of each stretch 51 and 52 of the cable 28 intermediate the drive means 50 and the movable assembly 24. One stretch 51 (intermediate drive 50 and assembly 24) is entrained over one cable entraining means 74 of the action member 60; and the other stretch 52 is entrained over the other cable entraining means 73 of the member 60. Cable guides 75 and 76 are at each side of the part of the cable entrained over the cable entraining means or pulley 74; and cable guides 77 and 78 are at each side of the part of the cable entrained over pulley 73. The cable guides are so located as to cause the cable to form an outward loop in its transit over each cable entraining means 73 and 74. The length of cable forming each outward loop is changed whenever the balance or action bar 60 is shifted in either direction from that balanced condition as illustrated in the drawing. A shift of position for action bar 60 will shorten the length of the part of the cable which forms the loop over one pulley (either pulley 73 or 74), but will commensurately increase the length of the part of the cable extending over the other.

Carried on action member 60 is a marker which is adapted to be sensed in order to detect a predetermined unbalanced condition for the stress balance means, specifically the action bar 60. The marker or markers may take the form of a projecting member (such as a screw) fixed on action bar 60.

In FIGS. 5 and 6, a primary sensing means or arm 79 is adapted to be displaced as either primary marker screw 80 or 81 abuts against sensing means 79. When action bar 60 is in balanced condition, the marker screws 80 and 81 are about equal in distance from primary sensor 79 but on opposite sides of it. Primary sensing means 79 detects a predetermined unbalanced condition for the stress balance means (that is, specifically, the balance or action bar 60 of it). When action bar 60 is shifted in either direction sufficiently for a screw 80 or 81 to abut against and displace sensor 79, a primary actuating means or microswitch 82 (mounted on the base frame so that sensor arm 79 projects as illustrated) responds and sends a signal to the reversible electric motor (through electrical conductors not shown in the drawing) for driving the drive pulley 50. In this manner the switch 82 actuates a reversal of the direction of travel for the assembly 24.

A subordinate sensing system may be included, if desired, for the purpose of effecting some function or result in response to a smaller unbalancing shift of the action bar 60 of the stress balance means than that predetermined unbalanced condition required for the primary sensing system to effect reversal of travel. The subordinate system illustratively is formed by subordinate sensing means or arm 83 on opposite sides of which are equally spaced subordinate projecting marker screws 84 and 85. Markers 84 and 85 are fixed on action bar 60.

The distance of each subordinate marker 84 and 85 from subordinate sensor 83 is less than the distance of each primary marker 80 and 81 from primary sensor 79. Thus, an unbalanced condition for the stress balance means, specifically action bar 60, is first sensed by the subordinate system. The beginning of an unbalanced condition for the stress balance means indicates that something is obstructing normal or a predetermined movement for the assembly 24. A responsive electrical means or switch 86 (mounted on base frame elements) responds to the sensing of an unbalanced condition by the subordinate sensor 83. Switch 86 suitably may be one causing a jolting charge of electrical energy to be sent to the electrode means 26 before the unbalanced condition of the action bar 60 becomes so great as to be sensed by primary sensor 79. Electrical connections for switch 86 and to the electrically conductive cable are not shown in the drawing and may take any suitable form.

At each end of a straight alleyway a stop member 87 and 88 may be placed (see FIG. 1). When assembly 24 abuts against either stop member 87 or 88, the action bar 60 of the stress balance means is shifted and the primary sensing system may be relied upon for effecting a reversal of the direction in which assembly 24 is drawn. Alternately, a separate system may be employed to effect reversal of the direction of travel of assembly 24 when it reaches an end of the alleyway. A variety of means are known for effecting electrically controlled automatic and reciprocating movement for scrapers and the like down an alleyway.

In the animal facility of the invention, the stress balance system described and illustrated in FIGS. 5 and 6 will effect emergency reversal of the direction of travel of assembly 24 at any point along its path of movement. The stress balance system is a critical part of the total power train for the movement of assembly 24.

An operator may establish any desired predetermined or normal rate of travel for assembly 24, whether intermittent or continuous. Usually, the normal rate of travel may be relatively slow, on the order of from 20 to 50 meters per hour. But faster or slower rates are also useful. Under such predetermined normal movement, the stress balance means is adjusted (i.e., the opposing stress members 69 and 70 are adjusted) so that it remains in substantially balanced condition. In balanced condition, the position of action bar 60 is approximately that illustrated in FIGS. 5 and 6. But that stress balance means (and particularly action bar 60) is responsively shifted into an increasingly unbalanced condition commensurate with any interference to that normal movement as may be caused by an object obstructing normal movement. If the obstructing object or animal quickly moves away from assembly 24, only a slight unbalanced condition for action bar 60 may be caused. It may be insufficient to be sensed by either the subordinate or the primary sensing system.

But if the object or animal stops (or even substantially lowers) the movement of assembly 24, action bar 60 will gradually shift into an unbalanced condition. As it moves, it will first trigger the operation of the subordinate sensing system. Then on sufficient further movement into a predetermined degree of unbalanced condition, the primary sensor 79 is struck by either projection 80 or 81 on action bar 60. That predetermined unbalanced condition, is therefore sensed by the primary sensor 79. In turn, electrical microswitch 82 responds to sensor 79 and causes or actuates a reversal of the direction of travel for assembly 24.

Further, details illustrating the operation of the stress balance means are: When the normal movement for assembly 24 is stopped by an obstruction, the stretch 51 of cable (assumed for the moment to be pulling assembly 24) is stopped in its movement—except for the part of the stretch 51 comprising the loop of cable over the cable entraining means 74. Continued pulling of the cable 51 by drive pulley 50 tends to increase the stress in, and to shorten, the loop over the affected pulley means 74. Additionally, the shortening of the loop over pulley 74 pushes action bar 60 downwardly in FIG. 5, which moves action bar 60 from a balanced into an unbalanced condition. Still further, the loop of cable over pulley 73 increases to an extent concomitant with the decrease or shortening of the loop over pulley 74. The movement of action bar 60 also causes a differential in the biasing stress of stress members 69 and 70. Stress member 70 is placed under compression and stress member 69 is relaxed or expanded. When the balanced condition is great enough, the subordinate sensing system first operates. When a further and predetermined degree of unbalanced condition is reached, the primary sensing means discussed above causes reversal of the rotation of drive pulley 50 and resultant reversal of the direction of travel by assembly 24. After reversal, the action bar 60 is returned to its normally balanced condition by the action of the biasing stress members 69 and 70.

If desired, the electrode means of the invention may be maintained in normally uncharged condition during its movement along the alleyway. Alternatively, it may be connected to an electrical source so as to carry (continuously or intermittently) a relatively low charge or low level of electrical energy, below that of a jolting charge. When carrying a low level of charge, it may further be suitably connected so as to be activated or energized into an animal-discomfort charged condition, that is, a jolting charged condition, in response to the subordinate sensing system aforediscussed. In embodiments where the electrode is normally uncharged, and where cable 28 is used to carry the jolting charge, it is not necessary to insulate the cable but the cable should of course be electrically conductive and connected by brush means or the like to an electrical power source controlled by the switch of the subordinate sensing means aforediscussed.

The voltages and amperages employed (or level of electrical energy employed) for effecting a jolting charged condition for the electrode may vary greatly. The jolting charge should be sufficient to cause discomfort to an animal obstructing movement of assembly 24; and the level of discomfort should be sufficient to motivate the animal to try to remove itself from the vicinity of assembly 24. But the minimum level of jolting charge effective for this purpose can vary depending upon the particular animals allowed in the alleyway and the amount of training or experience to which they have been subjected in the facility. The level of jolting charge obviously should be less than the level of charge which would cause harm or injury to the animals. The well known levels of voltage and amperage employed for conventional electric fences to achieve a jolting charged condition for them are most suitably employed. By employing the well known recommended levels of voltage with low amperage for electric fences, little danger exists that animals in the facility will be harmed.

A variety of modifications and additions and alterations may be made to the apparatus discussed herein without departing from essential features of the invention, particularly as set forth in the appended claims.

That which is claimed is:

1. In an animal facility comprising an alleyway, a movable assembly for clearing said alleyway, and power train means for effecting automatic movement of said assembly along said alleyway, the improvement characterized by the feature that said facility additionally includes means for emergency reversal of the direction of travel of said assembly at any point in its movement along said alleyway, said emergency reversal means comprising i. a stress balance means in said power train means, said stress balance means being in a substantially balanced condition during normal movement of said assembly but being responsively shifted into an increasingly unbalanced condition commensurate with any interference with said normal movement as caused by an object obstructing said normal movement, ii. primary sensing means for detecting a predetermined unbalanced condition of said stress balance means, and iii. actuating means responsive to said primary sensing means for actuating a reversal of the direction of travel of said assembly.

2. In an animal facility according to claim 1, the feature wherein said movable assembly comprises a scraper for scraping dung from said alleyway.

3. In an animal facility according to claim 2, the feature wherein said movable assembly comprises an electrode means, and wherein said facility additionally includes subordinate sensing means for detecting obstruction to said normal movement of said assembly prior to the sensing by said primary sensing means, and responsive electrical means actuated in response to said subordinate sensing means for sending a jolting charge of electrical energy to said electrode means prior to any emergency reversal of the direction of travel of said assembly.

4. In an animal facility according to claim 1, the feature wherein said movable assembly comprises an electrode, wherein facility includes means for charging said electrode.

5. In an animal facility according to claim 1, the feature wherein said movable assembly comprises an electrode means, and wherein said facility additionally includes subordinate sensing means for detecting obstruction to said normal movement of said assembly prior to the sensing by said primary sensing means, and responsive electrical means actuated in response to said subordinate sensing means for sending a jolting charge of electrical energy to said electrode means prior to any emergency reversal of the direction of travel of said assembly.

6. In an animal facility according to claim 5, the feature wherein said electrode means is normally uncharged during said normal movement of said assembly.

7. In an animal facility of claim 5, the feature wherein said electrode means is normally in a substantially continuously charged condition during said normal movement of said assembly, said substantially continuously charged condition being less than that of said jolting charge effected by said responsive electrical means.

8. In an animal facility according to claim 1, the feature wherein said stress balance means comprises an action member and means for biasing the same in said substantially balanced condition.

9. In an animal facility according to claim 8, the feature wherein said action member carries a marker adapted to be sensed by said primary sensing means when said action member reaches a said predetermined unbalanced condition.

10. In an animal facility according to claim 8, the feature wherein said power train means comprises a cable, and wherein any said interference with said normal movement of said assembly is carried to said action member through said cable.

11. In an animal facility according to claim 1, the feature wherein said power train means comprises a substantially endless cable attached to opposite sides of said movable assembly for pulling said assembly in either direction along said alleyway, and drive means for drawing said cable in either said direction, and wherein said stress balance means is interposed and acted upon by a part of each stretch of said cable intermediate said drive means and said movable assembly.

12. In an animal facility according to claim 11, the feature wherein said stress balance means comprises a base member, means for mounting said base member against movement, an elongated action member, means for mounting said action member to permit shiftable movement of it, opposing biasing stress members, each said stress member extending from a fixed position attached to said base member to a fixed position attached to said movable action member, the biasing stress of said stress members being substantially equal and opposite, whereby said stress members bias said action member in said substantially balanced condition, and cable entraining means at each end of said action member over which said cable is entrained.

13. In the animal facility of claim 12, the feature wherein said base member is elongated and in substantially parallel relationship to said action member, and wherein said shiftable movement of said action member is substantially longitudinal, whereby said action member during its said shiftable movement maintains said parallel relationship.

14. In the animal facility of claim 12, the feature wherein a part of one stretch of said cable intermediate said drive means and said assembly is entrained over one said cable entraining means and a part of the other stretch of said cable intermediate drive means and said assembly is entrained over the other said cable entraining means, cable guides at each side of each said part of said cable entrained over a said cable entraining means, said cable guides being located to cause said cable to form an outward loop in its transit over each said cable entraining means, whereby any said interference with said normal movement of said assembly effectively causes increased stress in and a shortening of said loop of said stretch of cable pulling said assembly and an unbalancing movement of said action member with concomitant increase of said loop of said other stretch of cable and a differential in the biasing stress of one said stress member as compared to the other, and wherein a marker on said action member is adapted to be sensed by said primary sensing means when said action member reaches a said predetermined unbalanced condition.

15. In an animal facility comprising a movable assembly and power train means for effecting automatic movement of said assembly along a direction of travel, the improvement characterized by the feature that said facility additionally includes means for emergency reversal of the direction of travel of said assembly, said emergency reversal means comprising i. a stress balance means in said power train means, said stress balance means comprising an action member and means for biaing the same in a substantially balanced condition during normal movement of said assembly, said action member being responsively shifted into an increasingly unbalanced condition commensurate with any interference with said normal movement, ii. primary sensing means for detecting a predetermined unbalanced condition for said action member, and iii. actuating means responsive to said primary sensing means for actuating a reversal of the direction of travel of said assembly.

16. In an animal facility according to claim 15, the feature wherein said movable assembly comprises a brush member.

17. In an animal facility according to claim 15, the feature wherein said movable assembly comprises a scraper.

18. In an animal facility according to claim 15, the feature wherein said movable assembly comprises an electrode means.

19. In an animal facility according to claim 18, the feature wherein said facility additionally includes subordinate sensing means for detecting obstruction to said normal movement of said assembly prior to the sensing by said primary sensing means, and responsive electrical means actuated in response to said subordinate sensing means for sending a jolting charge of electrical energy to said electrode means prior to any emergency reversal of the direction of travel of said assembly.

20. In a animal facility according to claim 15, the feature wherein said action member carries a marker adapted to be sensed by said primary sensing means when said action member reaches a said predetermined unbalanced condition.

21. In an animal facility according to claim 15, the feature wherein said power train means comprises a cable, and wherein any said interference with said normal movement of said assembly is carried to said action member through said cable.

22. In an animal facility according to claim 21, the feature wherein said stress balance means additionally comprises an elongated base member, means for mounting said base member against movement, said action member being elongated and aligned in substantially parallel relationship to said elongated base member, means for mounting said action member to permit said shiftable movement of it, and cable entraining means at each end of said elongated action member over which said cable is entrained.

23. In an animal facility according to claim 15, the feature wherein said power train means comprises a substantially endless attached to opposite sides of said movable assembly, and drive means for drawing said cable in either direction, and wherein said action member is interposed and acted upon by a part of each stretch of said cable intermediate said drive means and said movable assembly.

24. In an animal facility according to claim 23, the feature wherein opposite sides of said action member are each equipped with a cable entraining means, said facility being additionally characterized by the fact that a part of one stretch of said cable intermediate said drive means and said assembly is entrained over one said cable entraining means and a part of the other stretch of said cable intermediate said drive means and said assembly is entrained over the other said cable entraining means.

25. In an animal facility according to claim 24, the feature wherein said movable assembly comprises a brush member.

26. In an animal facility according to claim 24, the feature wherein said movable assembly comprises a scraper.

27. In an animal facility according to claim 24, the feature wherein said movable assembly comprises an electrode means.

28. In an animal facility according to claim 27, the feature wherein said facility additionally includes subordinate sensing means for detecting obstruction to said normal movement of said assembly prior to the sensing by said primary sensing means, and responsive electrical means actuated in response to said subordinate sensing means for sending a jolting charge of electrical energy to said electrode means prior to any emergency reversal of the direction of travel of said assembly.

* * * * *

UNITED STATES PATENT AND TRADEMARK OFFICE
CERTIFICATE OF CORRECTION

PATENT NO. : 3,960,110

DATED : June 1, 1976

INVENTOR(S) : Frank R. Laurenz

It is certified that error appears in the above-identified patent and that said Letters Patent are hereby corrected as shown below:

Column 3, line 65, "of" should read --or--.
Column 8, line 66 (Claim 1), "delecting" should read --detecting--.
Column 9, line 20 (Claim 4), "wherein facility" should read --wherein said facility--.
Column 10, line 23 (Claim 14), "intermediate drive means" should read --intermediate said drive means--.
Column 11, line 36 (Claim 23), "endless attached" should read --endless cable attached--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*